Nov. 28, 1967  M. G. HUNTINGTON  3,355,382
CENTRIPETAL ACCELERATION METHOD AND APPARATUS
Original Filed July 29, 1964  8 Sheets-Sheet 1

Fig. 1.

INVENTOR
MORGAN GURDON HUNTINGTON

BY
Lane, Aitken, Dunner & Ziems
ATTORNEYS

Nov. 28, 1967   M. G. HUNTINGTON   3,355,382
CENTRIPETAL ACCELERATION METHOD AND APPARATUS
Original Filed July 29, 1964   8 Sheets-Sheet 3

INVENTOR
Morgan Gurdon Huntington

BY
Lane, Aitken, Dunner & Ziems
ATTORNEYS

Nov. 28, 1967 M. G. HUNTINGTON 3,355,382
CENTRIPETAL ACCELERATION METHOD AND APPARATUS
Original Filed July 29, 1964 8 Sheets-Sheet 5

INVENTOR
Morgan Gurdon Huntington

BY
Lane, Aitken, Dunner & Ziems
ATTORNEYS

F = GALLONS OF WATER
THRU OSMOTIC MEMBRANE
PER DAY PER SQ. FT.

INVENTOR
MORGAN GURDON HUNTINGTON

BY
Lane, Aitken, Dunner, & Ziems
ATTORNEYS

Fig. 8.

United States Patent Office 3,355,382
Patented Nov. 28, 1967

3,355,382
CENTRIPETAL ACCELERATION METHOD
AND APPARATUS
Morgan G. Huntington, Galesville, Md., assignor to Waterdrink, Inc., Salt Lake City, Utah, a corporation of Nevada
Continuation of application Ser. No. 385,964, July 29, 1964. This application Oct. 22, 1964, Ser. No. 418,574
22 Claims. (Cl. 210—22)

This application is a continuation of applicant's copending application Ser. No. 385,964 filed on July 29, 1964, now abandoned.

This invention relates to the winning of fresh water from inorganic and/or organically polluted solutions by reverse osmosis and also relates to the separation of light molecular weight solutions from heavy molecular weight solutions by pressure modified dialysis. This invention particularly relates to a method of and apparatus for preventing the excessive concentration of solute and for preventing the excessive accumulation of precipitates against the osmotic or dialytic divider surface at any water flux and at any primary solution circulation rate.

This invention also relates to a method of preventing suspended solids from contacting the osmotic membrane, and/or dialytic membrane surface, thus eliminating the necessity for clarifying incoming turbid solutions in order to avoid the encrustation, blinding and/or erosion of the dividers by insoluble matter.

This invention further relates to a method of forming and supporting osmotic and dialytic membranes which affords an incomparably large effective water-permeable surface in proportion to the total volume of apparatus.

This invention also relates to a method of rotating the membrane supporting assembly in such a manner that liquids and suspended particulate matter are subjected to constant acceleration greater than gravity in a direction away from the effective fluid-dividing surface, thereby continually forcing concentrated solution and particulate matter away from the fluid-dividing surface by centripetally induced convection so that both the solvent flux and solute diffusion through the semi-permeable divider become independent of the solution circulation rate past the divider surface.

This invention also relates to the employment of centripetally induced convection to minimize the difference of solute concentration across the osmotic divider and to supplement the solute diffusion rate on the solution side of the membrane by mass transfer and to retard the solute diffusion rate on the solvent side of the membrane.

This invention also relates to the improvement of membrane solution permeability in reducing the degree of pressure deformation of the membrane body by lowering the over-all required hydraulic pressure applied to the surface of the membrane for any given solvent flux.

This process also relates to a method of concentrating dissolved organic matter from raw sewage and/or dissolved inorganic salts from sea water wherein precipitated compounds and other particulate matter, which might be pressed against the membrane surface, are repeatedly freed from the membrane surface by pressure waves, such as those induced by modified water hammer, periodically exerted against the water side of the membrane or by momentarily reducing the applied solution pressure.

The process of separating water from saline and/or organic solutions by reverse osmosis consists of forcing the solution, at a pressure in excess of its osmotic pressure, against a supported, molecular and ion-restraining, semi-permeable divider that, under optimum conditions, passes water more freely than solute. The divider can be an osmotic membrane composed principally of cellulose acetate, as disclosed in U.S. Patents Nos. 3,133,132 and 3,133,137 for example, which passes water and limits the transport rate of most inorganic and organic solutes, the mechanics of which are not yet satisfactorily explained, or the divider between solution and water can be a hydrophobic porous filter which is impermeable to solutions and to water but permeable to water vapor. In this latter case the process is referred to as vapor gap reverse osmosis.

The osmotic pressure between water and sea water, for example, when separated by a water permeable and ion-restraining membrane, is well known and has a value of about 370 pounds per square inch absolute. The principle of extracting water from both inorganic and organic solutions by exerting a pressure on the solution somewhat greater than the osmotic pressure has long been recognized as physically possible and thermodynamically advantageous over other water-extracting principles. However, mechanical deficiencies have heretofore prevented the development of commercially practical sewage treatment and water recovery processes involving reverse osmosis techniques.

When a non-volatile non-electrolyte is dissolved in a liquid, the vapor pressure and the freezing point are lowered, the boiling point is raised and the osmotic pressure between solution and solvent manifests itself. These four colligative properties of non-electrolyte solutions depend upon the number of solute molecules present.

The osmotic pressure between a solvent separated by a semi-permeable divider from a dilute solution of a non-electrolyte solute obeys the relationship, $$\pi = nRT, \text{ or } \pi = cRT$$

where:

$c = n/V$ is the concentration of solute in moles per liter;
R is the universal gas constant;
T is the absolute temperature.

However, when dealing with solutions of electrolytes, these colligative properties are amplified by factors which, in dilute solutions, approach the number of solute ions per mole of solute present. The Van't Hoff factor, $i$, which modifies the osmotic pressure as $\pi = icRT$, is defined as $$i = \frac{\pi}{\pi_0}$$

where $\pi$ is the observed osmotic pressure of a solution of an electrolyte; $\pi_0$ is the osmotic pressure calculated from $\pi = n/VRT = cRT$.

Obviously, as the solution becomes more dilute, factor $i$ approaches the number of ions per mole, which would become 2 in the cases of NaCl and KCl and 3 for $BaCl_2$.

Figure 8:
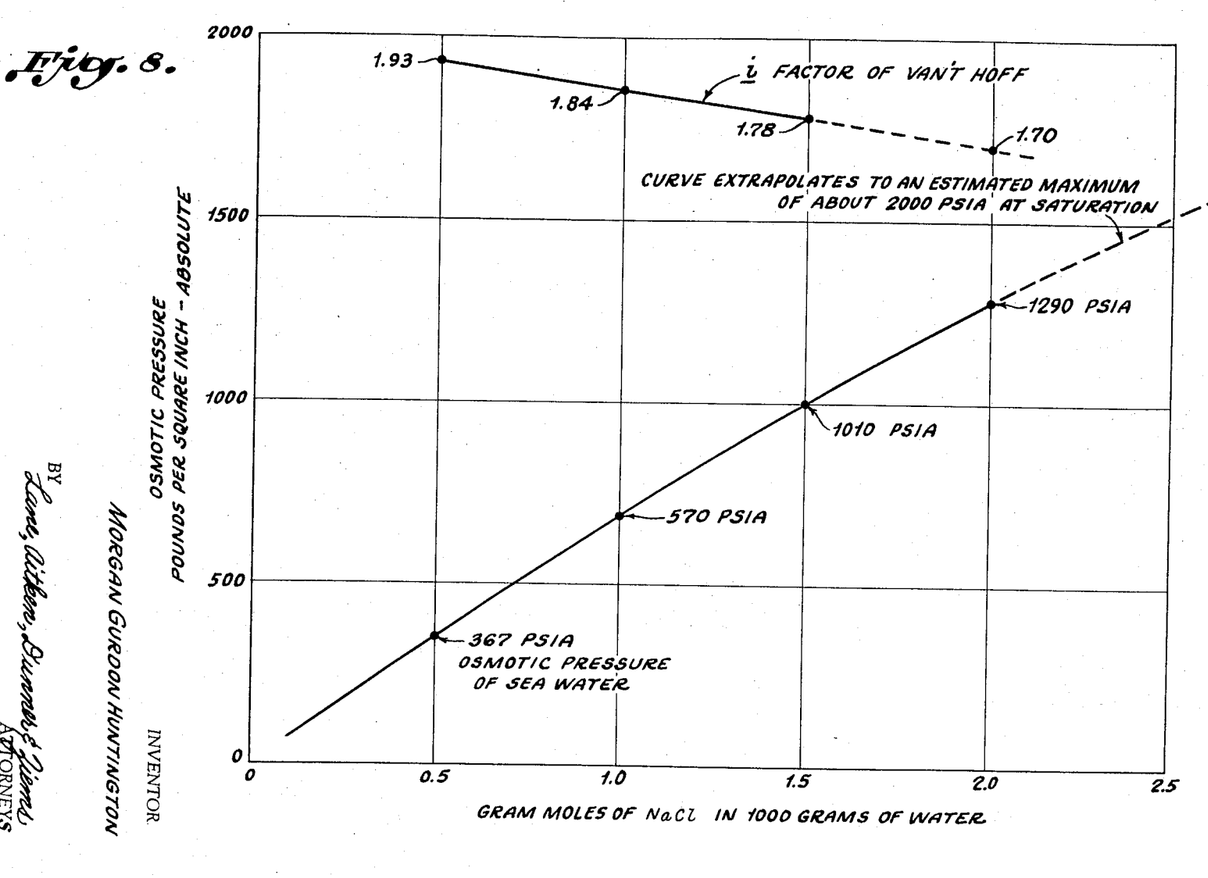
FIGURE 8 is a plot of the approximate values of osmotic pressure as a function of the ratio of salt concentration in water across a semi-permeable osmotic membrane, as estimated from the Van't Hoff "$i$" of ion inter-attraction.

That factor $i$ decreases as the solution of an electrolyte becomes more concentrated is explained in terms of the interionic attraction theory. At saturation of a solution by an electrolyte, evidently the interionic attraction is very high and the osmotic pressure is much less than would be predicted if all ions were considered as single particles and if the osmotic pressure were extrapolated as a straight line and as a first power function of the solute concentration. This is illustrated in FIGURE 8.

When solutions containing different concentraitons of solute are separated by a semi-permeable divider, solvent moves across the divider from the lower concentration and dilutes the more concentrated solution. At the same time, the solute diffuses through the semi-permeable divider to enrich the solution of lower concentration.

Although the movement of solvent across the divider can be halted or even reversed by exerting a pressure on the more concentrated solution equal to or greater than the difference in osmotic pressure, the diffusion of solute is practically unaffected by change in hydraulic pressure, by the direction of solvent flow or by the rate of forced solvent flux.

In the process of reverse osmosis the solution pressure is maintained greater than the osmotic pressure so that solvent flow is reversed. Whatever the actual mechanics of solvent and solute transport, in true osmotic membranes, solute leaves the solvent at or near the semi-permeable divider surface and thereby concentrates at the phase interface. The rate at which the solute is brought to the divider surface is a function of the rate at which solvent is forced through the divider.

The salient, limiting factor in separating water from brine by reverse osmosis and using a semi-permeable membrane, for example, is the problem of removing the concentrated solute from the membrane surface. The concentrated solute at the membrane boundary layer can ordinarily be transported away from the phase interface by two means only: (a) by diffusion back into the brine, and (b) by diffusion through the semi-permeable membrane. In either case, the quantity of solute transported per unit time is proportional to the area and to the concentration gradient in the direction of diffusion and is expressed by the differential equation, which is analogous to that for thermal diffusivity, $$\frac{dW}{dt} = -DA\frac{dC}{dZ}$$

where $W$ = weight of solute transferred
$t$ = time in seconds
$D$ = diffusion coefficient, cm.$^2$/sec.
$A$ = area of diffusion front, cm.$^2$
$C$ = concentration in grams/cc.
$Z$ = distance measured in the direction of diffusive flow, cm.

Integrating the above equation, we obtain $$W = U \cdot A \cdot \Delta C$$

where $W$ = weight of solution transferred, gm./sec.
$U$ = overall diffusion coefficient, $$\frac{\text{g./sec.}}{(\text{cm.}^2)(\text{g./cc.})}, \text{ or cm./sec.}$$

$A$ = area of diffusion face, cm.$^2$
$\Delta C$ = logarithmic mean of the concentration gradient, $$\text{g./cc.} = \frac{\Delta C_1 - \Delta C_2}{2.3 \log \Delta C_1 / \Delta C_2}$$

Figure 6:
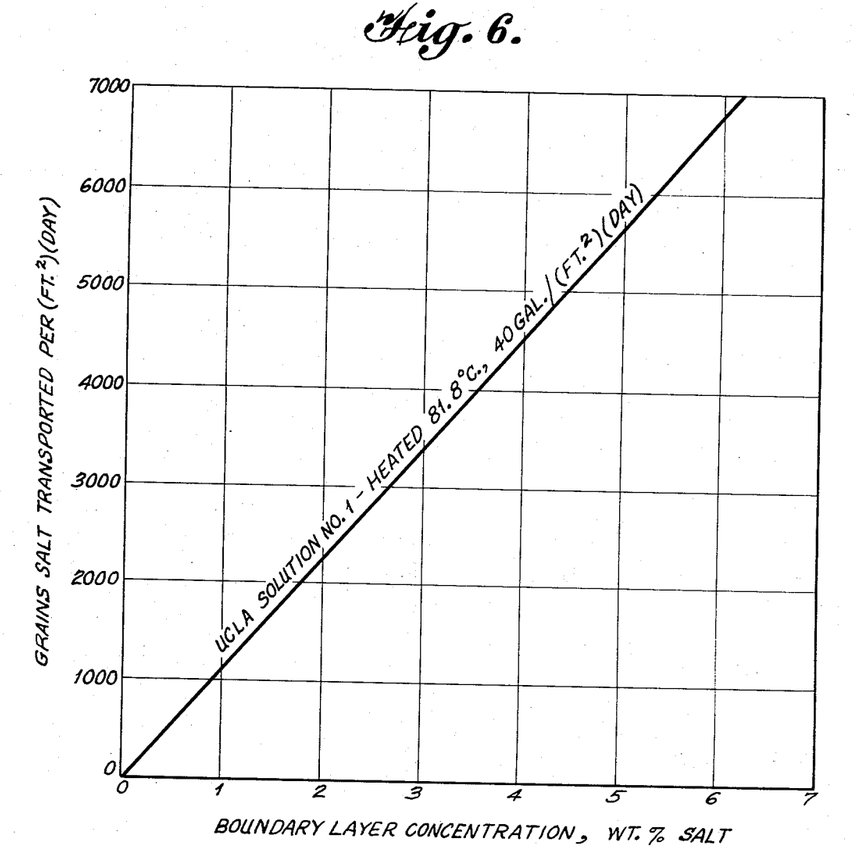
FIGURE 6 plots the salt transport across a semi-permeable boundary as a function of concentration.

From the above expression, it is clear that the higher the concentration of solute at the boundary layer, the more rapid the transport of solute through the membrane into the product solvent, as is shown in FIG. 6, which is derived from the actual performance of UCLA membrane No. 1, described in UCLA Report No. 63–22, Department of Engineering, University of California, Water Resources Center, Contribution No. 74 (May 1963). Also, the more nearly saturated is the bulk of the solution, the slower is the rate of diffusion of concentrated solute back into solution and away from the phase interface.

The water flux, or rate of solvent flow through the osmotic membrane, may be expressed by $$F = K(\Delta P - \pi)$$

where

F is the water flux (water production per unit area).
$\Delta P$ is the pressure drop across the membrane.
$\pi$ is the osmotic pressure difference across the membrane.
K is the membrane constant determined by properties of the particular membrane.

Figure 7:
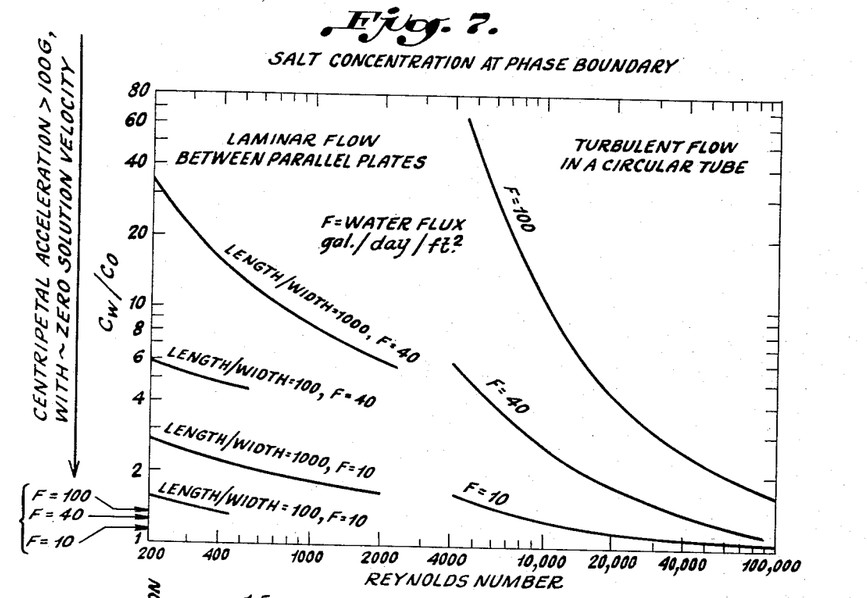
FIGURE 7 plots the theoretical ratio of salt concentration in the membrane boundary layer to the salt concentration in the discharged brine as a function of Reynolds number for the fluid flow of brine past the membrane at various water flux values.

As is shown in the above basic equation, boundary layer effects are also extremely important in modifying the rate of water flow through any osmotic membrane. At high rates of water flow through the membrane, the solute concentration immediately against the membrane will rise. The osmotic pressure will therefore also rise to decrease the effective pressure of the brine ($\Delta p - \pi$) and consequntly decrease the water flow through the membrane. This is illustrated in FIG. 7. Another adverse effect of solute concentration against the membrane when operated at high water flux is the actual deposition of compounds precipitated from the concentrated solution upon the membrane surface which further reduces the membrane's permeability to water. Yet another boundary layer effect stems from the difficulty in forming absolutely perfect membranes, most of which contain some defects in the form of actual holes. Because the solution normally reaches its highest concentration at the membrane surface, any physical leak must allow the direct passage of highly concentrated solution and, therefore, the adverse effect of such membrane imperfaction is greatly magnified.

The boundary layer conditions noted above which adversely effect the production rate of water through osmotic membranes are at least equally serious in the functioning of hydrophobic filters which provide a vapor gap between solution and water in the similar process of vapor gap reverse osmosis. Vapor gap reverse osmosis is thought to differ from osmotic membrane process mechanics principally in that a porous hydrophobic filter replaces the membrane, and phases change from liquid to water vapor and back to water. The porous filter of certain pore size and pore volume is permeable to water vapor but impervious to water and to solution even when pressurized well above the osmotic pressure. Such hydrophobic filters, the pores of which are filled with water vapor and constitute the vapor barrier, have served to demonstrate the process as technically feasible but the water flux rates are discouragingly small.

On the other hand, osmotic membranes have been developed which are permeable to distilled water in the order of one to seventy gallons per day per square foot under pressures of 500 to 1500 pounds per square inch. Certain semi-permeable dividers can reject a high proportion of the dissolved salts under laboratory test conditions. Product rate has, so far, been inversely propotional to the initial salinity and commercial scale demonstration of sea water demineralization has not so far materialized.

Several pilot plant operations incorporating the principle of reverse osmosic have recently demonstrated an operable process which can continuously produce potable water from brackish water (i.e. less than 5000 p.p.m.) at rates comparable to those obtained in the laboratory. However, in all processes so far demonstrated, the energy consumption is in the order of three to five times that required to pump the brackish water to system pressure and about 10 times the theoretical minimum of 2.9 kwh. per 1000 gallons of water from sea water. Successful and continuous desalination of sea water by reverse osmosic has yet to be demonstrated, even on a pilot plant scale.

The energy required to win fresh water from saline sources by reverse osmosis, whether by membrane solution mechanics or by vapor gap phase change mechanics, is the work necessary to pump the incoming stream to system pressure, divided by the yield and by the several mechanical efficiency factors. For example, to pump 1000 gallons of sea water to a pressure of 1500 pounds per square inch theoretically requires about 10.8 kilowatt hours of energy. Then, if the water yield factor is taken as 0.33 and the motor and pump efficiency factors are assumed to be 0.8 each, the gross energy requirement becomes:

or 51.1 kwh. per 1000 gallons of product water.

Obviously, there are presented these possibilities of process improvement in respect to energy demand for sea water desalination:

(a) Improved yield of desalinated and decontaminated water, which implies a higher solute concentration in the tailing solution.
(b) The optimization of pump and motor design for the particular service.
(c) Reduction of the practical system pressure which can be effected by:
  (1) Improved membrane permeability to water;
  (2) Increased area of effective membrane surface;
  (3) Improvement of the means of removing concentrated solution and particulate matter from the membrane surface.
(d) Reduce the system pressure drop by:
  (1) Lowering the solution velocity across the membrane surface and throughout the system generally;
  (2) Improving the permeability of the lower part of the membrane and of the membrane support;
  (3) Providing a means of continuously removing salts, such as gypsum, which may precipitate upon the membrane.
(e) Recovering most of the pumping energy requirement from the high pressure tailing solution by hydraulic turbine directly connected to pumps or by some other means.

By effecting all of the more obvious economies, the net energy demand for extracting water from sea water can be reduced to about 20 kwh. per 1000 gallons, or slightly below.

All demonstrated processes for the winning of fresh water from solutions by reverse osmosis are dependent solely upon the velocity of solution over the membrane surface for removal of the solute concentrated by the passage of water through the osmotic membrane. Heretofore, at a given solution pressure, water flux has always been proportional to the velocity of solution across the membrane surface. However, even at turbulent flow and no matter how smooth the surface, some fluid at the membrane surface must approach zero velocity, and dependence upon solution circulation for the removal of concentrated solute from the membrane surface is unsatisfactory. Such an inherently defective mechanism cannot give the highest possible water flux because, in the final analysis, the rate of solute removal from the membrane surface must remain largely a function of diffusion back into solution. Furthermore, high velocity circulation of solution is seriously wasteful of pumping energy.

Therefore, it is an object of this invention to more rapidly and more effectively remove concentrated solution and precipitated compounds from the membrane surface by forcing mass transfer by convection through subjecting the system to constant radial acceleration in a direction away from the membrane surface and thereby to make the water production rate independent of the solution circulation rate.

Turbid saline water must be thoroughly clarified before use in demonstrated systems in order to prevent serious erosion of the membrane surface. This is very expensive and impractical, and it is therefore also an object of this invention to hold the osmotic membrane harmless from solid matter suspended in solutions.

At low temperatures, high water flux and low solution circulation rate, previously demonstrated processes precipitate salts from sea water, particularly gypsum, against the membrane surface and thereby reduce the water flux. Indeed, when extracting water from sea water by reverse osmosis, it has been noted that a reduction in the volume of brine by as little as one-tenth can cause $CaSO_4 \cdot 2H_2O$ (gypsum) to precipitate against the membrane surface. As these plate-like crystals cover the membrane surface, the permeability of the membrane is reduced and the water flux falls accordingly at any given brine pressure. Furthermore, when operating an osmotic membrane on sea water at a very high water flux, the precipitation of salts against the membrane surface ordinarily renders the process practically inoperable, despite extremely high brine circulation rates. It is accordingly an important object of the process of the present invention to prevent precipitated salts from remaining in contact with the membrane surface and to make the operation of reverse osmosis more practical at low sea water temperatures, at high water output rates and at high ratios of salt concentration. A particular object of the present invention is to prevent precipitated compounds from remaining in contact with the membrane surface by repeatedly inducing a modified water hammer on the water side of the osmotic membrane so that the momentary water pressure plus centrifugal force imparted to the rotary assembly by centripetal acceleration are together sufficient to overcome the force of the solution pressing precipitated compounds against the membrane surface.

It is also an object of this invention to permit the actual precipitation and discharge of selected salts suspended in brine when salt recovery may be a purpose of the process.

Because plant cost is a direct function of apparatus volume and of the floor space required, it is a further object of this invention to use concentric, multiple membranes for the reverse osmosis extraction of water from solutions.

It is also an object of this invention to recover potable water from raw sewage and to concentrate the putrescible substances into a relatively small stream in order to facilitate stabilization by conventional means.

Additional objects and advantages of the present invention will become more apparent from the description and claims, as well as from the accompanying drawings, wherein:

The following treatment of rotation about a fixed axis is introduced to explain how the present invention employs centripetal acceleration to force the convection of denser media away from the solution side of an osmotic membrane, away from the solution side of a vapor gap, hydrophobic filter and away from the primary solution side of a dialytic membrane:

When a particle is rotated about an axis, it is accelerated perpendicularly away from the axis. Such centripetal acceleration is expressed by:

$$a = r\omega^2$$

where $a$ is centripetal acceleration in feet per second per second
$r$ = particle distance away from the axis of rotation in a direction perpendicular to such axis
$\omega$ is the angular velocity in radians per second.

Centripetal acceleration of a particle may also be expressed as:

$$a = \frac{\pi^2}{900} r (\text{r.p.m.})^2$$

where $a$ is acceleration in feet per second per second
$r$ is the perpendicular distance of the particle from the axis of rotation
r.p.m. is rotations per minute.

For example as $$(\text{r.p.m.})^2 = a \frac{900}{r\pi^2}$$

in order that the centripetal acceleration equal the acceleration of gravity, $$(\text{r.p.m.})^2 = 32.2 \times \frac{900}{r\pi^2}$$

$$(\text{r.p.m.})^2 = \frac{2940}{r}$$

or, the centripetal acceleration of a particle one foot from the axis of rotation, revolving 54.1 times a minute would be approximately equal to the acceleration of gravity.

As a further quantitative example, a particle one foot from the axis of rotation, revolving 242 times a minute, would be subjected to an instantaneous acceleration of twenty times the acceleration of gravity. Also, the acceleration of gravity would be multiplied by 100 at 541 r.p.m. Furthermore, since force equals mass times acceleration, the instantaneous force acting to pull the particle away from the axis of rotation would be respectively, twenty and one hundred times the force of gravity.

Thus, it becomes clear that the rotation of a cylindrical vessel of liquid about its longitudinal axis will force the convection of relatively dense fluids and particulate matter toward the outer wall of the containing vessel and that strong convective forces are induced even at rather moderate rotational speeds. Also, it is clear that the radial acceleration the more rapid will be the outward convection of denser solution.

In the treatment of certain types of solutions and/or under certain conditions, the centripetally modified reverse osmosis process described above is extremely effective in diminishing the solute content of such solutions. For example, below certain water flux rates there is no significant problem of crystal precipitation and the process described above works quite effectively.

On the other hand, there are conditions of operation under which salt crystals must precipitate at the membrane surface and these salt crystals tend to be held against the membrane surface by the flow of water therethrough. It follows that only by decreasing the pressure drop across the membrane can salt crystals so held be released.

The complete release of precipitated compounds pressed against the membrane surface by the flow of water therethrough can be effected in only two ways: (1) either the primary solution pressure must fall to a value less than the water pressure plus the osmotic pressure across the membrane, or (2) the water pressure plus osmotic pressure must, momentarily at least, equal or exceed the static pressure of the solution. It should be obvious that the solution pressure difference cannot, even momentarily, be less than the centrifugal force tending to expand the membrane, else the membrane could suffer destruction.

Because it is impractical to repeatedly reduce the static pressure in order to halt flow through the membrane, and because the membrane might thereby inadvertently suffer rupture by centrifugal force, the process of the present invention provides for the use of water hammer and two other less rapid means of pressurizing the water side of the membrane as herebelow explained.

The phenomenon known at water hammer is produced by the sudden stoppage of flow within a pipe. When a valve is quickly shut at the downstream end of a long pipe, the liquid comes to rest progressively due to a pressure wave in the system. The pressure wave moves upstream from the closed valve at the velocity of sound in the liquid medium. When the pressure wave reaches the upstream end of the pipe, the liquid is at rest throughout the system, but the pressure is momentarily everywhere increased. The velocity of the pressure wave depends upon the elasticity of the metal walls and upon the ratio of its thickness to the diameter of the pipe. If the pipe were perfectly rigid, the speed of the pressure wave leaving the suddenly closed valve would be that of sound through water, about 4,700 feet per second.

The increased pressure of water hammer is proportional to the arrested velocity of flow and to the speed of propagation of the pressure wave. This increased pressure is about 60 p.s.i. for each foot per second of extinguished velocity for two to six inch pipes. Such an increase to pressure can be attained only when the valve is closed faster than one round trip of the pressure wave.

For a complete treatment of water hammer and its control, see chapter 3, pages 79–80 of Marks Mechanical Engineers' Handbook, sixth edition.

The present invention may employ any one of three methods of momentarily increasing the pressure on the water side of an osmotic membrane in order to halt the flow therethrough and so that the force holding the particulate matter against the membrane is overcome by centrifugal force. The following methods of pressurizing the water side of osmotic membranes are listed in the descending order of pressure application speed:

(1) Very rapid closing of the water discharge line, extinguishing the velocity of efflux and converting the kinetic energy thereof into pressure known as water hammer.

(2) Closing the water discharge line and subsequently admitting high pressure water on the upstream side of the valve.

(3) Closing the water discharge line and allowing the pressure to rise on the water side of the membrane, thereby momentarily stopping or reducing the water flow therethrough. A further effect of repeatedly raising ehe pressure on the water side of the membrane and/or momentarily decreasing the solution pressure is to allow the osmotic pressure to back-flush the membrane with fresh water as may be required by operating conditions.

The present invention may be explained in still greater detail through reference to the appended drawings.

Figure 1:
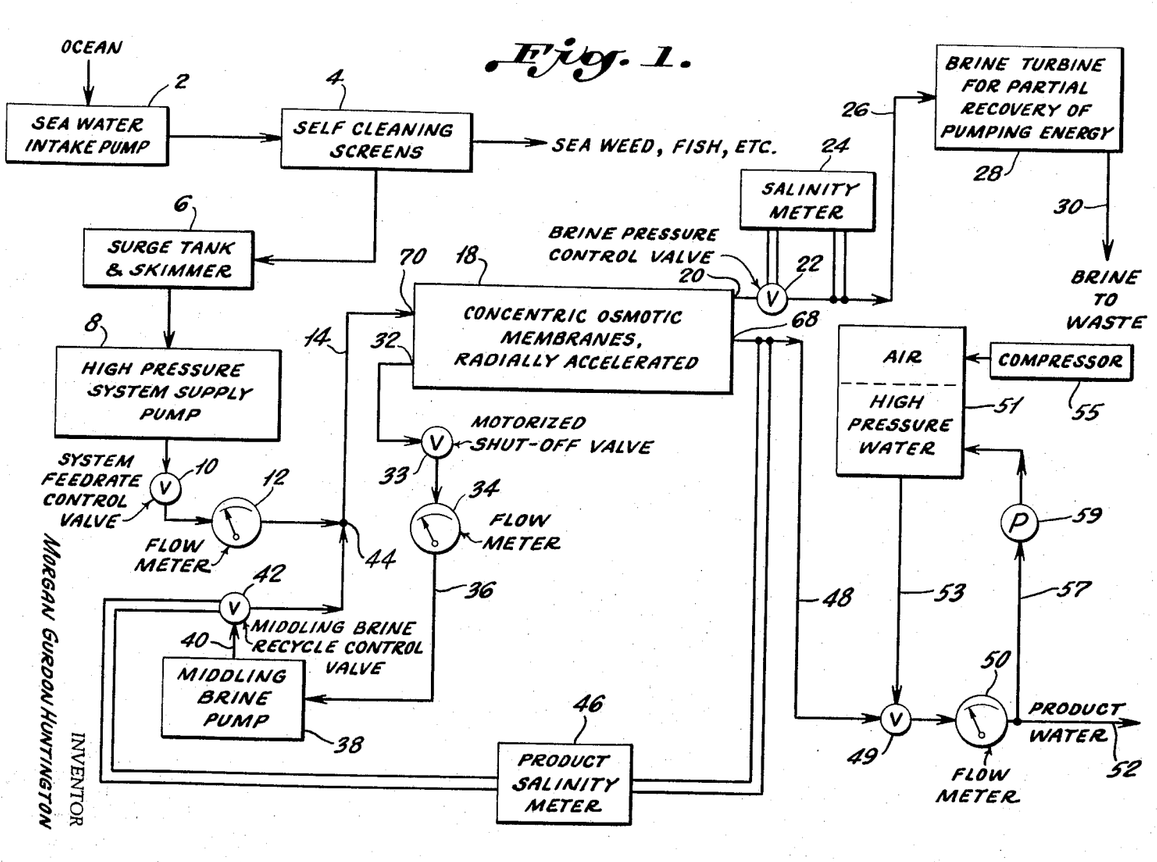
FIGURE 1 is a schematic flow sheet diagram of the process of the present invention indicating the major items of equipment, instrumentation and controls.

FIGURE 1 is the flow sheet diagram of the process of the present invention and shows the sequence of fluid flow and the means of controlling the process. Saline water from the sea or from another source is pumped by intake pump 2 through self-cleaning screens 4 into surge tank 6. The hight pressure system supply pump 8 pumps saline water through system feed rate control valve 10 through flow meter 12, through high pressure main 14, entering the radially accelerated membrane assembly 18 at saline water inlet gland 70.

The brine, concentrated to a salinity determined by the variables of system pressure, residence time at pressure against the osmotic membrane and the membrane characteristic, is discharged from rotating membrane assembly 18 through outlet 20. Brine pressure, up to the maximum output pressure pump 8, is controlled by brine discharge valve 22. Valve 22 is regulated by salinity meter 24, reading the salinity of the brine in discharge line 26.

The potential energy of the discharged brine may be partially recovered by hydraulic turbine 28.

Because the dependable salt rejection by the osmotic membranes considered in the present example is taken to be 95 percent of the brine salinity, two-stage operation is essential if potable water is to be the product, i.e., water containing less than 500 parts per million, as will be hereinafter explained in connection with Table 1. Therefore, with two-stage operation, employing two concentric osmotic membranes in the presently described embodiment of the process of the present invention, salt must also be rejected in the form of a middling brine, which is considerably less concentrated than the primary brine, as is illustrated in Table 1.

As illustrated in FIGURE 1, middling brine is discharged from the rotating membrane assembly 18 at 32 and is measured by flowmeter 34 in line 36. Middling brine pump 38 restores the pressure drop through the first stage membrane and returns the repressurized middling brine to the saline water line 14. The rate of flow of middling brine from membrane assembly 18 determines its saline concentration. Control of middling brine flow is effected by pump discharge valve 42 which reacts to salinity meter 46 which measures the salinity of the product water leaving the membrane assembly 18 through line 48.

Product water leaves the membrane assembly at outlet 68 and the flow is measured by flowmeter 50 in line 48. Product water is pumped from main 52 by a distribution pump (not shown).

With further reference to FIGURE 1, any precipitated salts which collect at the membrane surface as previously described are released from the brine side of the first and second stage membranes when the reverse osmotic flow is stopped momentarily. In the process of the present invention, water flow through the membranes is repeatedly interrupted by suddenly increasing the water discharge pressure by rotating motorized three-way valve 49 so that, simultaneously or sequentially, outflow of water is stopped and, at the same time or subsequently, high pressure water from air-capped tank 51 is admitted through line 53 into product water line 48 with the aid of compressor 55. Also, just before closing valve 49, middling brine outlet valve 33 is closed.

The water pressure in air-capped tank 51 is sufficient to supplement the osmotic membrane pressure so that combined, the total water pressure is equal to or greater than the brine pressure, thus momentarily stopping the reverse osmotic flow of water through the membranes.

Following the release of precipitated salts from the membranes as indicated above, the supply of water in air-capped tank 51 is replenished through line 57 by means of pump 59.

If the three-way valve 49 is closed relatively slowly, water hammer contributes nothing to the pressure increase on the water side of the membranes. However, when a very short dwell of overpressure on the water side of the membranes is desirable, the rapid closing of valve 49 without admission of high pressure water could supply adequate instantaneous pressure, provided that the extinguished velocity in line 48 were of sufficient magnitude as defined above.

Figure 2:
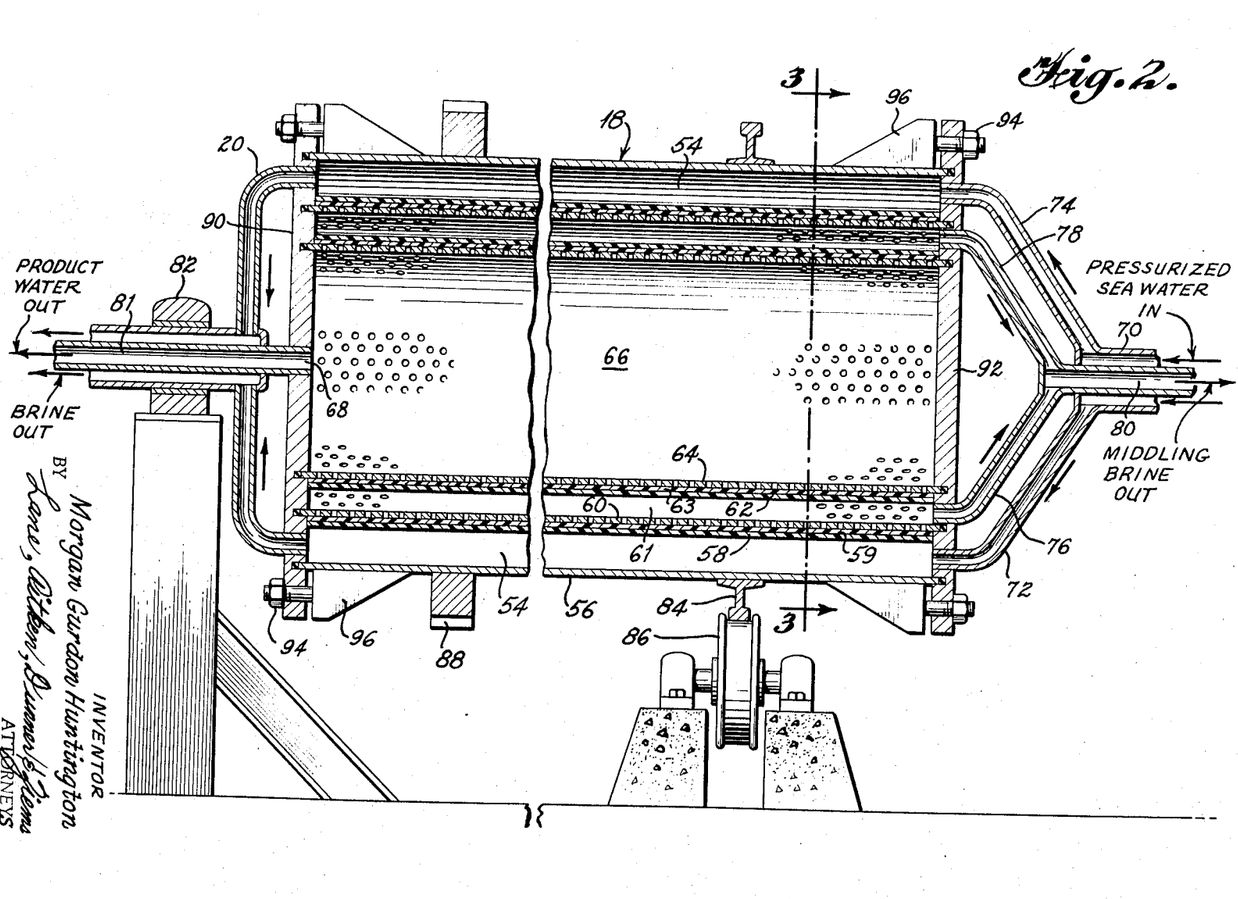
FIGURE 2 is a schematic longitudinal section showing a two-stage concentric arrangement of osmotic membranes, their supporting structure and fluid flow through the rotating apparatus.
Figure 3:
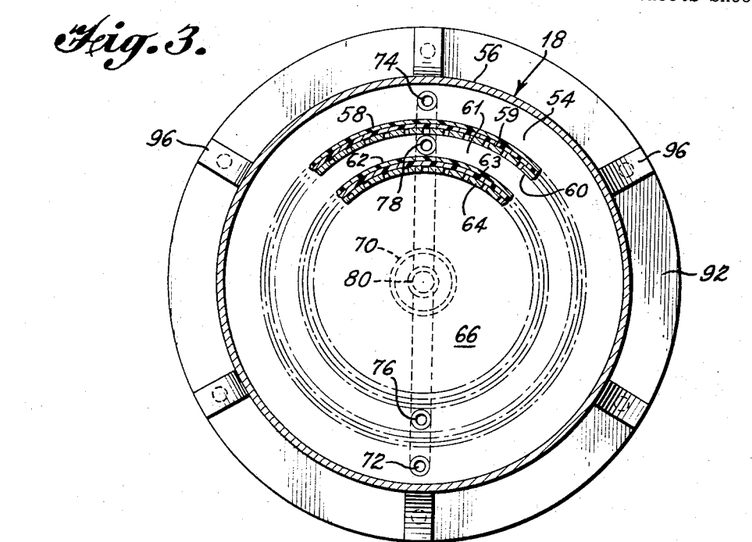
FIGURE 3 is a transverse section through lines 3—3 of the apparatus of FIGURE 2, showing the concentric arrangement of membranes within a brine pressure shell.

Now referring to FIGURES 2 and 3, the structure and the internal fluid flow of the rotating membrane assembly 18 are herebelow described:

Saline water raised to system pressure by system supply pump 8 enters the rotating concentric membrane assembly 18 through axial inlet gland 70. The saline water feed is radially distributed by two or more balanced lines 72 and 74 to enter the annular space 54 between the pressure shell 56 and the primary cylindrical osmotic membrane 58.

Because, in the present example, 95 percent of the brine's salt is rejected by the osmotic membrane 58, the salinity of the water forced through membrane 58, through the water permeable, fiber reinforced filter paper 59 and through pervious support 60 into annular space 61 has but two percent of the salinity of the brine in annular space 54. However, because the second and inner concentric osmotic membrane 62 also rejects 95 percent of the salt from the water forced therethrough, the middling brine must increase in salinity. The maximum allowable salinity of the middling brine in annular space 61 is determined by the specifications of the product water as is shown in Table 1.

The removal of salt as middling brine from annular space 61 through radial outlets 76 and 78 through axial gland 80 is controlled by pump discharge valve 42 which reacts to the salinity of product water in line 48, also as explained above.

The product water, forced through the second stage membrane 62, water permeable, fiber reinforced filter paper 63 and pervious support 64, leaves the central cylinder 66 through axial outlet 68 and product water gland 81 to be pumped from main 52, as explained above.

The rotating concentric membrane assembly 18 can be supported by trunnion bearing 82 and by hoop rail 84 running on idlers 86 and be driven by a pinion gear (not shown) engaging ring gear 88, or the assembly can be supported on two trunnion bearings and V-belt driven.

The brine pressure shell 56 is shown as cylindrical. However when substantial amounts of suspended solids enter with the saline water feed, it would be advantageous that the brine pressure shell be made in the form of a truncated cone with the larger diameter at the brine discharge end, in order to facilitate movement of the denser slurry centrifugally held against the shell.

The ends 90 and 92 of the pressure shell are grooved to accommodate the cylindrical membrane supports 60 and 64 in their sealing end gaskets. The ends are tightened against the gasketed membrane supports and the gasketed pressure shell 56 by the bolts 94 through lugs 96 which are welded to the pressure shell or which may be made continuous of steel rods or bolts.

After assembly, the rotating device is statically and dynamically balanced by the adjustment of peripheral weight (not shown).

Because the novel method and apparatus of the present invention eliminates the excessive accumulation of salts against the osmotic membrane surface at any water flux or brine circulation rate, it becomes feasible to use osmotic membrances which afford an incomparably large effective osmotic surface in proportion to the total volume of the apparatus employed. Obviously, the variety of configurations of membrane surface which can be utilized in accordance wtih the principles of the present invention is limitless.

Procedures are at hand for applying and/or casting semi-permeable membranes upon the outside of the pervious cylindrical support of the present invention. For example, the formation of an osmotic membrane on the rotatable cylinder of a centripetal accelerator within the contemplation of the present invention may be effected by providing a water permeable, fiberglass pipe, such as is manufactured by the Amercoat Corporation at Brea, Calif, made smooth on its inside surface to thereby provide a completely suitable cylindrical membrane support on which a membrane (such as one made of cellulose acetate) may be cast or otherwise placed. The temperature, time, materials, proportions and sequence of environments for applying satisfactory membrane material to such a support are disclosed, by way of example, in U.S. patents 3,133,132 and 3,133,137 (the disclosures of which are hereby incorporated by reference).

Another means of membrane support can be provided by a metal, cylindrical support containing radially extending bores, groups of which are circumferentially connected by peripheral, annular grooves less than 1/16 inch wide and spaced apart about 1/2 inch, the grooves being bridged by means of water permeable, fiber reinforced filter paper or some other stiff material and the membrane being placed on said filter paper.

In the event that the solution from which water is being extracted yields some substance lighter than water, which would tend to collect at the membrane surface, a modification of the rotatable membrane shape becomes necessary. For example, in extracting water from sewage effluent, certain compounds lighter than water, such as fats, waxes and oils, become centrifugally separated and must be continuously removed from the membrane surface. For such service, the surface of the membrane, by suitable forming of the supporting assembly, is in the shape of a truncated cone with a slope about 1/4 inch per foot in relation to its axis of rotation. Also, at the smaller diameter end of the rotatable assembly, light media bleed tubes are provided for coaxial take-off, similar to the take-off ports shown in FIG. 2. When more than trace amounts of constituents are mixed with the solution being separated, it is best to subject the feed stream to a centrifuging treatment to remove such light constituents ahead of the membrane system.

Table 1 and Table 1–A set forth figures for the carrying out of the two-stage desalination of saline water by reverse osmosis as modified by centripetal acceleration in accordance with the principles of the present invention. The figures includes in Table 1 and Table 1–A illustrate results to be obtained when the product water is to have 500 p.p.m. of salts. A cellulose acetate osmotic membrane having a regular cross-sectional configuration and capable of 95% salt rejection at a water flux of 40 gal./ft.$^2$ day, as described in UCLA Report 63–22, is used for each stage, with the feed brine containing 35,000 p.p.m. of salt. As will be seen from Table 1, the potable water yield volume (with middling brine excluded for purposes of simplification) is 31.0% of the incoming solution.

TABLE NO. 1.—TWO STAGE DESALINATION OF SALINE WATER BY REVERSE OSMOSIS AS MODIFIED BY CENTRIPETAL ACCELERATION

[Salt rejection, 95% per membrane stage]

| Stage | Brine A | | Brine B (Middling Brine) | | Product Water |
|---|---|---|---|---|---|
| | In | Out | In | Out | |
| Salts, Parts Per Million | 35,000 | 52,500 | 2,625 | 10,000 | 500 |
| Brine Concentrating Ratio | | 1½:1 | | 3.8:1 | |
| Fraction of Initial Saline Water Volume, percent | 1 | 61.7 | 38.3 | 7.3 | |
| Potable Water Yield, Middling Brine Excluded,[1] percent | | | | | 31.0 |

[1] Note: The figures set forth in this table have not been adjusted to take into account recycling of middling brine, in the interests of simplification. Accordingly, the figures represent approximations only, but may be readily corrected by taking into account the dilution of feed brine at 35,000 p.p.m. salts with middling brine at 10,000 p.p.m. salts.

TABLE NO. 1-A.—THE TWO STAGE WINNING OF POTABLE WATER FROM THE SEA BY REVERSE OSMOTIC PRESSURE MODIFIED BY CENTRIPETAL ACCELERATION

| | Primary Membrane | Secondary Membrane |
|---|---|---|
| Membrane characteristics as set forth in the UCLA Report No. 63–22: | | |
| Casting Solution | No. 1 | No. 1 |
| Membrane Heating Temperature, °C | 81.8 | 81.8 |
| Water Flux, Gal./(Day) (Ft.$^2$) when ΔP−Δπ=750 p.s.i., gal | 40 | 40 |
| Salt Transport Across Membrane Per Ft.$^2$/Day, grains | 6,140 | 1,170 |
| Salt Rejection when Water Flux=40 Gal./(Day) (Ft.$^2$), percent | 95 | 95 |
| Salinity of Feed, p.p.m | 35,000 | 2,625 |
| Salinity of Discharge, p.p.m | 52,500 | 10,000 |
| Salinity of Product, p.p.m | 2,625 | 500 |
| Feed Concentration Ratio | 1½ to 1 | 3.8 to 1 |
| Middling Volume, Percent of Feed | 38.3 | |
| Potable Water Yield, Percent of Feed | | 31.0 |
| Osmotic Pressure, p.s.i | 530 | 92 |
| Overpressure due to Boundary Layer Concentration; $C_w/C_o=1.1$ when the Centripetal Acceleration is Greater than 100 g., p.s.i | 53 | 9 |
| Membrane Pressure Drop at 40 Gal./(Day) (Ft.$^2$) Report No. 63–22, ΔP−Δπ, p.s.i | 750 | 750 |
| Brine Circulation (none), p.s.i | 0 | 0 |
| Total Stage Pressure, p.s.i | 1,333 | 851 |
| Equivalent Single Stage Pressure, 1,333=(851÷0.383)=1,659 p.s.i. | | |

Potable Water Yield from Sea Water per day for each Square Foot of Membrane: 40/2=20 Gal./(Day) (Ft.$^2$).
Estimated Net Energy Requirement: less than 20 kwh. per 1,000 Gal. of Potable Water.
Estimated Capital Investment: $0.25 per Gallon per Day of Potable Water from Sea Water.

Figure 4:
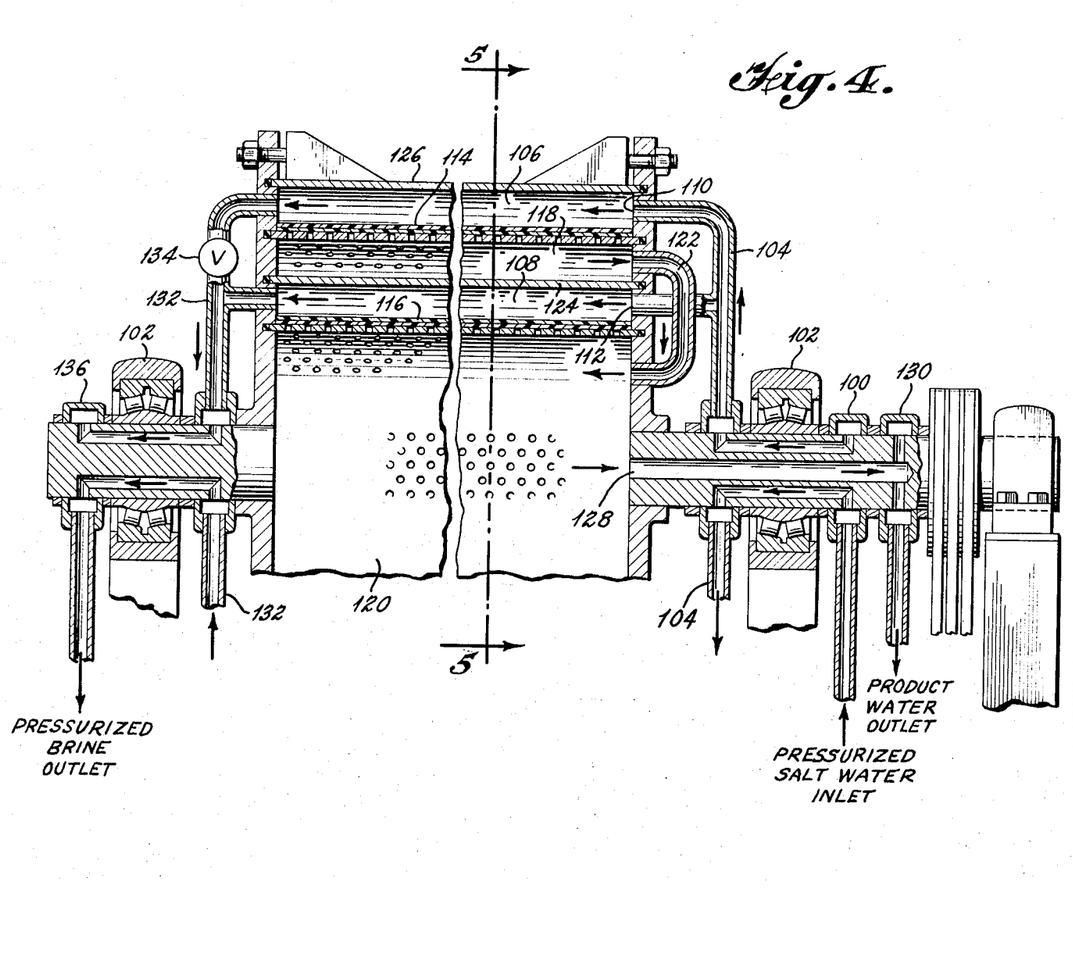
FIGURE 4 is a schematic longitudinal section of a rotating apparatus incorporating two single stage membranes, both of which reject a common concentrated brine and extract a common product of reduced salinity from a common feed of saline water.
Figure 5:
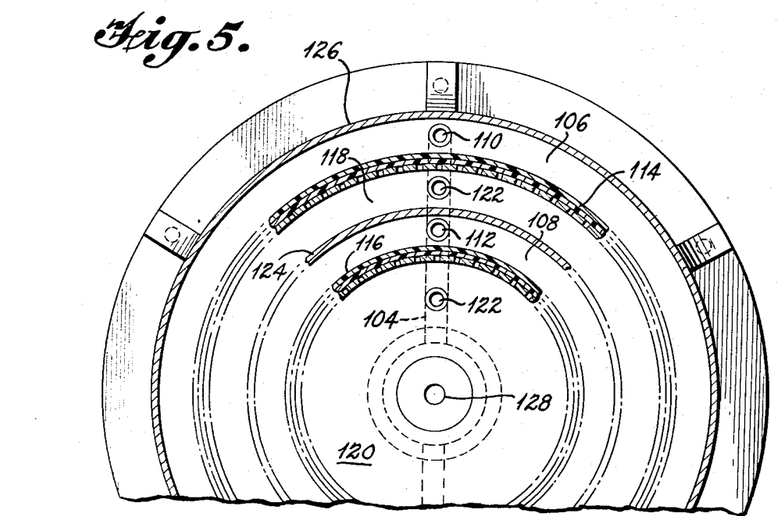
FIGURE 5 is a transverse section along lines 5—5 of FIGURE 4 showing the concentric arrangement of single stage membranes separated by an impervious divider.

FIGURE 4 and FIGURE 5 respectively illustrate a schematic longitudinal section and a schematic transverse section along lines 5—5 of FIG. 4 of a rotating apparatus incorporating two (or more) single stage osmotic membranes, both of which reject a common concentrated brine and extract a common product of reduced salinity from a common feed of saline water. In this apparatus, pressurized saline water enters rotating shaft injection gland 100 to flow axially under self aligning bearing 102, thence through a radial feed injection manifold 104. From radial injection manifold 104 the saline water enters the concentric brine chambers 106 and 108 through openings 110 and 112. Water substantially demineralized is forced through cylindrically supported osmotic membranes 114 and 116 into concentric water chamber 118 and into central water chamber 120. Product water from concentric water chamber 118 is conducted around impervious concentric separator 124 and membranes 116 by product water by-pass 122.

The product water is bled from the assembly through axial port 128, thence through shaft outlet gland 130.

Saline water leaves the concentric brine chambers 106 and 108 through manifold 132, thence through axial outlet gland 136. Brine flow through the concentric membrane assembly is balanced by adjusting valve 134.

A valve (not shown) downstream from the brine outlet brine outlet gland 136 reacting to a salinity meter (not shown) reading product salinity limits the brine concentration ratio.

As was the case with the pressure shell 56 of FIGURES 2 and 3, pressure shell 126 is shown as cylindrical but may be fabricated in the form of a truncated cone to facilitate movement of denser slurry centrifugally held against the shell if this is deemed desirable.

While FIGURE 4 does not illustrate any provision for the release of salts or other solids precipitated against the osmotic membranes (as was the case in the system of FIGURE 1), provision may be made for this purpose if desired.

Table 2 sets forth operating data for an exemplary run of such a single stage technique in accordance with the principles of the present invention, as applied to the desalination of brackish water.

TABLE NO. 2.—SINGLE STAGE REVERSE OSMOTIC DESALINATION OF BRACKISH WATER AS MODIFIED BY CENTRIPETAL ACCELERATION

[Salt rejection by membrane, 98%]

|  | Brine In | Brine Out | Product Water |
|---|---|---|---|
| Salt Concentration, Parts per Million | 1,000 | 25,000 | 500 |
| Brine Concentrating Ratio | | 25/1 | |
| Fraction of Initial Saline Water Volume | 1 | 1/25 | 24/25 |
| Potable Water Yield, percent | | | 96.0 |

Figure 9:
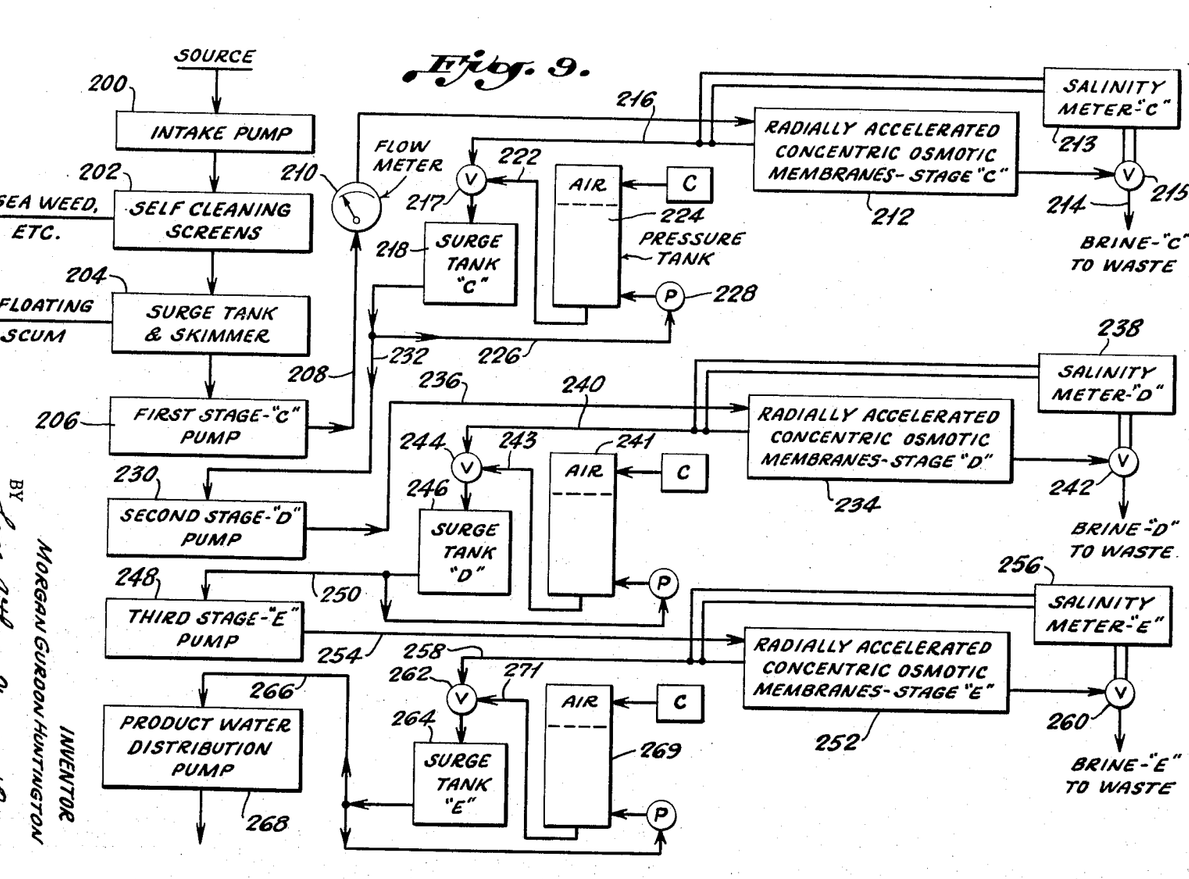
FIGURE 9 is a flow sheet diagram illustrating the operation of a three-stage sea water desalination system embodying the present invention.

In order to further explain the operation of this invention, herebelow is described the three-stage desalination of sea water by three osmotic membranes in series as shown in Table No. 2. [Note: Semi-permeable membranes have been developed which reject as much as 99 percent of the dissolved salt when a brine pressure is applied greater than the osmotic pressure. However, because such membranes usually include at least minor imperfections, the following example of the process of the present invention provides for the use of membranes which will reliably reject no more than 95 percent of the dissolved salt.] With reference to the three-stage flow sheet diagram of FIGURE 9 and employing the apparatus shown in FIGURES 4 and 5 for each of the stages of the process, the fluid flow is traced as follows:

Sea water is forced by intake pump 200 over self-cleaning screen 202 into surge tank and skimmer 204. From surge tank 204, first stage pump 206 forces the sea water through line 208, through flowmeter 210 and into the primary rotating concentric osmotic membrane assembly 212 of the type shown in FIGURES 4 and 5 and previously described.

Salinity meter 213 reads the salinity of the water discharging from the primary rotating membrane assembly through line 214 and operates brine discharge control valve 215. Thus, the salinity of the primary discharge brine C, for any given membrane characteristic, is a function of the salinity criterion of the feed stream to the secondary membrane assembly, Stage D, as shown in Table No. 2.

With continued reference to FIGURE 9, the partially desalinated water leaves Stage C assembly 212 through line 216 to flow through valve 217 into surge tank 218.

Because the concentration of brine is highest in the primary osmotic assembly, salts, particularly gypsum, must be removed from the membrane surface by intermittently stopping the water flow through the semi-permeable membrane. The procedure is as follows:

Valve 217 (see FIGURE 9) is operated to close line 216 and subsequently open the line 216 to line 222. Thereupon, the water in tank 224, pressurized by means of compressor 223, immediately raises the pressure in line 216 and on the water side of the primary semi-permeable membranes in assembly 212 so that the back pressure supplied plus the osmotic pressure is momentarily greater than the brine pressure. For example, as shown in Table No. 2, the osmotic pressure across the primary membranes between water containing 105,000 p.p.m. and 5,250 parts per million of dissolved salts is approximately 1000 p.s.i.a. If the total pumping pressure generated by primary pump 206 is, say, 1500 p.s.i.a., tank 224 must be at a pressure of at least 500 p.s.i. in order to halt the flow of water through the membrane and thereby releasing whatever particulate material was so held against the membrane surface. (As explained earlier, a very fast pressure pulse of short duration can be effected by closing valve 217 so rapidly that water hammer results.)

Following the release of whatever particulate matter was held against the membrane surface by momentarily back-flushing the membranes, valve 217 is returned to its usual position and reverse osmosis resumes in assembly 212. At this point, the supply of water in air-capped tank 224 is replenished through line 226 by means of pump 228.

The partially desalinated water leaving the Stage C assembly 212 at practically atmospheric pressure enters second stage pump 230 through line 232 and is raised in pressure sufficiently (e.g., to about 500–700 p.s.i.) to overcome the approximately 400 p.s.i. osmotic pressure between outlet brine of Stage D (containing 36,400 p.p.m. of salt) and the secondary product of Stage D (containing 1,820 p.p.m. of salt) [see Table 2], plus the pressure drop of the system required for a reasonable (>10 g.p.d./ft.$^2$) water flux.

The partially desalinated water from Stage C (5,250 p.p.m.) enters the secondary membrane assembly 234 (Stage D) through line 236 where it is concentrated by reverse osmosis to the extent that the secondary product water does not exceed 1,820 p.p.m. of salt. Salinity meter 238 reads the salinity of the second stage product water in line 240.

Again, as was the case with the operation of Stage C, precipitated salts are removed from the membranes in Stage D by means of air-capped tank 241, line 234 and valve 244.

It should be noted that no brine at all leaves membrane Stage D through valve 242 until the salinity in line 240 rises to 1,820 p.p.m. of salt, as shown in Table No. 2. Likewise, in the primary Stage C, no brine passes through valve 215 until the salinity in line 216 rises to 5,250 p.p.m., also as shown in Table No. 2.

Product water from the Stage D assembly 234 (at about 1,820 p.p.m. of salt) leaves through line 240, valve 244 and into surge tank 246 at about atmospheric pressure. This water enters Stage E pump 248 through line 250 and is raised in pressure sufficiently by pump 248 (e.g., to about 150–300 p.s.i.) to overcome the approximately 100 p.s.i. osmotic pressure between outlet brine E (containing 10,000 p.p.m. of salt) and the secondary product of Stage E (containing 500 p.p.m. of salt) [see Table No. 2], plus the pressure drop of the system required for a reasonable (again, >10 g.p.d./ft.$^2$) water flux.

Stage D product water is forced into the Stage E assembly 252 through lines 254 where it is desalinated to the ultimately desired salt concentration (e.g., 500 p.p.m.) by reverse osmosis as modified by centripetal acceleration as previously described.

Salinity meter 256 reads the salinity of the product water in line 258 and, as was previously the case, no brine at all leaves the Stage E assembly through valve 260 until the salinity in line 258 rises to 500 p.p.m. of salt, as shown in Table No. 2.

Product water of the desired salt concentration leaves Stage E assembly 252 through valve 262, into surge tank 264, through line 266 and is finally delivered to its destination by product water distribution pump 268.

As was the case with Stages C and D, precipitated salts are removed from the membranes in Stage E by means of air-capped tank 269, line 271 and valve 262.

TABLE NO. 3.—THREE STAGE REVERSE OSMOTIC DESALINATION OF SALINE WATER AS MODIFIED BY CENTRIPETAL ACCELERATION

[Salt rejection, 95% per membrane]

|  | Brine C | | Brine D | | Brine E | | Product Water |
| --- | --- | --- | --- | --- | --- | --- | --- |
|  | In | Out | In | Out | In | Out |  |
| Salt Concentration, p.p.m. | 35,000 | 105,000 | 5,250 | 36,400 | 1,820 | 10,000 | 500 |
| Approximate Osmotic Pressure (±10%), p.s.i.a. |  | 1,000 |  | 400 |  | 100 |  |
| Brine Concentrating Ratio |  | 3/1 |  | 7/1 |  | 11/2 |  |
| Fraction of Initial Saline Water Volume | 1 | ⅓ | ⅔ | 2/21 | 4/7 | 8/47 | 39/47 |
| Potable Water Yield, percent |  |  |  |  |  |  | 46.7 |

Note.—All brine is rejected in calculating the materials balance.

In the practice of the present invention, (1) the pumped pressure of the feed solution against the membrane surface and (2) the required speed of rotation of the centripetal accelerator are determine as follows:

(1) *Determination of pumped solution pressure.*—Using demineralized water as the initial feed, determine the pumping pressure necessary to obtain the required operating water flux rate, which will give the fluid pressure drop ($P_w$) through the membrane when no solute is present. This demineralized water pumping pressure, added to the experimentally-determined osmotic pressure ($P_{os}$) between solution and water (an example of which is shown in FIG. 8), equals the total pumping pressure which would obtain when $C_w/C_o = 1$ (where $C_o$ is the solute concentration in the bulk of the solution and $C_w$ is the solute concentration in the fluid boundary layer at the membrane; see FIG. 7).

Obviously, if $C_w/C_o$ were to equal 1, that is, if there were no concentration of solute at the membrane surface, the total pressure would be but slightly greater than the sum of the water pressure drop through the membrane and matte plus the osmotic pressure between solution and pure water. However, because the removal of water from solution by passage through the semi-permeable membrane must, at least momentarily, effect some degree of concentration at the membrane surface, $C_w/C_o$ is always greater than unity.

For example, with reference to FIGURE 7, laminar solution flow past the membrane surface in the case of circular tubes, and at a water flux of 40 gallons per square foot per day, results in a considerable concentration of solute at the membrane surface and $C_w/C_o$ is seen to be as high as 10/1.

As is indicated in FIG. 8, the maximum osmotic pressure between brine and water is about 2000 p.s.i. and the limit of $P_{os} \times C_w/C_o$ is about 2000 p.s.i.a. so long as precipitated salts do not actually cover the membrane, in which case the membrane may be considered to be, in effect physically blinded.

(2) *Determination of centripetal acceleration and rotational speed as function of water flux.*—The rate of convective movement is dependent upon the magnitude of centripetal acceleration. Moreover, the greater the acceleration, the smaller is the increment of density necessary to initiate convective movement within the solution. Therefore, the higher the centripetal acceleration to which the solution is subjected, the lower is the limit to which the solution can be concentrated at the boundary layer. It follows that the ratio $C_w/C_o$ is an inverse function of centripetal acceleration.

As an example, the values of $C_w/C_o$ shown in FIGS. 7 and 8 for forced convection are obtainable with centripetal accelerations between 100 and 400 times the acceleration of gravity, that is, a cylindrically mounted membrane two feet in diameter, rotating at 541 r.p.m., subjects the membrane boundary layer to a centripetal acceleration of 100 times the acceleration of gravity. Likewise, a rotational speed of 1082 r.p.m. applied to the same membrane would subject the membrane boundary layer to an acceleration, away from the membrane surface, of 400 times the acceleration of gravity.

The limit of centripetal acceleration is that at which the membrane and matte would suffer damage by tending to fly apart. However, such change from centrifugal force is not possible at any rotational speed contemplated in the practice of this invention. For example, when rotating at 1082 r.p.m., a two-foot diameter member and matte is subjected to a centrifugal force 400 times that of gravity. Since the matte and membrane weigh less than 14.4 pounds per square foot, or less than ¹⁄₁₀ pound per square inch, the centrifugal force at 400 times the force of gravity is 40 pounds per square inch. However, the hydraulic pressure of the solution always exerts a force many times greater than the centrifugal force. Therefore, centrifugal rupture of the membane and matte is impossible as long as a certain minimum solution pressure is maintained.

Figure 11:
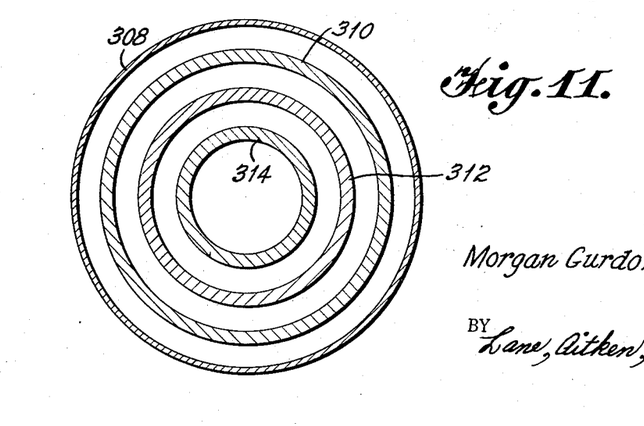
FIGURE 11 is a schematic end view of a three stage concentrically arranged centripetal accelerator.

As an example of the foregoing, reference may be made to a three-stage concentric membrane centripetal accelerator assembly as shown in FIGURE 11. [Note: The structure shown in FIG. 11 has been illustrated schematically for ease of reference, only the pressure shell 308 and the three semi-permeable membranes 310, 312 and 314 being shown.] In the structure of FIG. 11, membrane 310 has a diameter of two feet and an exposed surface area of 6.2 ft.² per axial foot of cylinder, membrane 534 a diamter of 1½ feet and an exposed surface area of 4.7 ft.²/ft., and membrane 314 a diameter of one foot and an exposed surface area of 3.1 ft. ²/ft. By rotation of the assembly at 1082 r.p.m. membrane 310 is subjected to a centripetal acceleration of 400G, membrane 312 to 300G and membrane 314 to 200G.

FIGURE 7 is reproduced from page 44 of the 1963 Saline Water Conversion Report of the Department of the Interior and illustrates improvements made by the present invention upon the art of desalinating water by reverse osmosis. FIGURE 7 clearly points up the limitation of the process when the turbulent flow of brine past the membrane surface is relied upon for control of boundary layer salt buildup. The text of the 1963 Saline Water Conversion Report pertinent to FIGURE 7 follows:

"The ordinate in figure 37 is the salt concentration adjacent to an osmotic membane divided by the salt concentration in the bulk liquid flowing past the osmotic membrane; the abscissa is the Reynolds number of the flow. Turbulent flow of the brine in a tubular osmotic membrane and laminar flow of the brine in the channels between parallel stacks of flat osmotic membranes are included in the analysis. Curves are shown for several water fluxes through the osmotic membrane and, for the laminar case, two channel length/width ratios. At low water flux rates and high Reynolds numbers, the salt buildup at the membrane surface is not great. But pumping cost considerations put practical limits upon the flow Reynolds number, and for practical Reynolds numbers, $C_w/C_o$ can be as high as 2 for water flux rates of approximately 10 g.p.d. per square foot, attainable with today's membranes. Since much research is currently being directed toward improving osmotic membrane capacities in order to reduce membrane costs, it is anticipated that membranes giving water flux rates of 40 to 100 g.p.d. per square foot will be developed. Figure 37 shows that the problem of salt buildup at the membrane surface may become increasingly serious as better membrances become available. Since the osmotic pressure is approximately proportional to the salt concentration, it is readily seen that large values of $C_w/C_o$ will result in higher operating pressures and greatly increased costs for the reverse osmosis process. * * *"

FIGURE 7 also illustrates the marked advantage of using forced convection over a high lateral fluid velocity for removing concentrated solution from the membrane surface. As indicated, at a centripetal acceleration greater than 100G with zero solution velocity, the $C_w/C_o$ ratio is 1.5 or less at water fluxes of up to 100. On the other hand, water fluxes of this magnitude are not achievable with such low $C_w/C_o$ ratios even at extreme turbulent flow using conventional reverse osmosis techniques. The tremendous power economy and the significantly increased membrane life directly resulting from being able to use water fluxes of great magnitude at relatively low or zero flow rates are immediately apparent from the foregoing.

Figure 10:
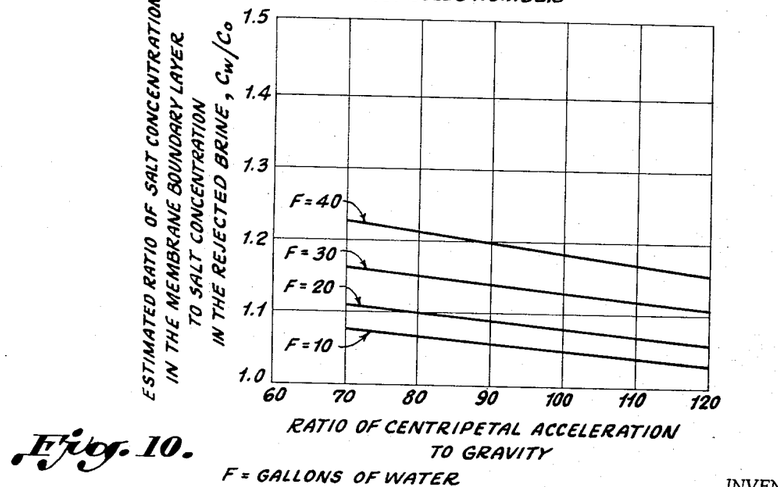
FIGURE 10 plots the estimated ratio of salt in the boundary layer to salt concentration in the rejected brine against centripetal acceleration for various water flux values.

For a clearer understanding of the principle of this invention, FIGURE 7 is to be compared to FIGURE 10.

Because of the radial acceleration involved in the process of the present invention, any appreciable solute concentration at the boundary layer results in an instant fluid imbalance. The induced velocity of convection is, of course, a direct function of the square of the angular velocity of rotation of the cylindrical membrane assembly.

In the practice of this invention, the ratio of salt adjacent to the membrane to the salt in the rejected brine is an inverse function of radial acceleration. This is illustrated in FIGURE 10 where the estimated values of $C_w/C_o$ are plotted against radial acceleration. Moreover, at radial accelerations in the order of 100 times gravity and above, salt concentration in the boundary layer must rather closely approach the salt concentration in the bulk of the brine, even at extremely high water flux values.

In the preceding discussion, a novel method of and apparatus for winning fresh water from saline solutions has been set forth. As will be readily apparent from this discussion, however, the principles involved in such method and apparatus are equally applicable to reverse osmosis processes involving any solute-containing solvent wherein it is desired to decrease the concentration of solute in the solvent (or to increase such concentration, depending upon the desired product). For example, such principles are equally applicable to the recovery of water from raw sewage and to concentrate the putrescible substances into a relatively small stream in order to facilitate stabilization by conventional means. Similarly, the principles of the present invention are applicable to the separation of solutions of light molecular weight from solutions of greater molecular weight. In such a process, the solution separator will be constituted by a dialytic membrane and the solutions separated by reversed dialytic pressure modified by radial convection by means of the centripetal acceleration technique of the present invention.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. In a process for the desalination of a saline solution wherein said saline solution is placed into contact with one side of a semi-permeable membrane under a pressure greater than the osmotic pressure of said saline solution, the improvement comprising subjecting said saline solution to acceleration greater than gravity in a direction away from said one side of said membrane.

2. In a process for the diminution of the solute content of a solvent wherein the solute-containing solvent is placed into contact with one side of a semi-permeable membrane under a pressure greater than the osmotic pressure of said solute-containing solvent, the improvement comprising subjecting said solute-containing solvent to acceleration greater than gravity in a direction away from said one side of said membrane.

3. In a process in which a solute is removed from a solvent by bringing said solvent into contact with one side of an osmotic divider under a pressure greater than the osmotic pressure of said solvent, the improvement comprising subjecting said solvent to sufficient centripetal acceleration to result in the convection of solvent increased in its concentration of said solute in a direction away from said one side of said osmotic divider.

4. A process as defined in claim 3 wherein said process is a vapor gap reverse osmosis process and wherein said osmotic divider comprises a vapor gap.

5. A process as defined in claim 3 wherein said process is a vapor gap reverse osmosis process and wherein said osmotic divider comprises a hydrophobic porous filter which is impermeable to water but permeable to water vapor, said fluid being a saline solution.

6. A process as defined in claim 3 wherein said osmotic divider is a semi-permeable membrane permeable to said fluid but substantially impermeable to said solute.

7. In a process for the desalination of saline water wherein said saline water is placed into contact with one side of a semi-permeable membrane under a pressure greater than the osmotic pressure of said saline water, the improvement comprising subjecting said saline water to sufficient centripetal acceleration to result in the convection of concentrated saline water in a direction away from said one side of said membrane.

8. In a process in which the solute concentration of a solvent is diminished by bringing said solvent into contact with an osmotic divider at a pressure in excess of the osmotic pressure of said solvent, the improvement comprising removing said solute from the effective osmotic divider surface by forced convection through subjection of the system comprising said osmotic divider and solute-containing solvent to radial acceleration in a direction away from said effective osmotic divider surface.

9. A process as defined in claim 8 wherein said forced convection is centripetally induced.

10. Apparatus for carrying out a process in which a solute is removed from a solvent by bringing said solvent into contact with one side of an osmotic divider at a pressure in excess of the osmotic pressure of said solvent, said apparatus comprising: an osmotic divider; means for bringing a solute-containing solvent to be subjected to said process into contact with one side of said osmotic divider at a pressure in excess of its osmotic pressure; means for withdrawing solvent diminished in its content of said solute from the other side of said osmotic divider; and means for subjecting said solvent to sufficient centripetal acceleration to result in the convection of solvent increased in its concentration of said solute in a direction away from said one side of said osmotic divider.

11. Apparatus as defined in claim 10 additionally comprising a second osmotic divider; means for bringing said solute-diminished solvent into contact with one side of said second osmotic divider at a pressure in excess of its osmotic pressure; means for withdrawing solvent still further diminished in its solute content than said solute-diminished solvent from the other side of said second osmotic divider; said acceleration-subjecting means also subjecting said solute-diminished solvent to acceleration greater than gravity in a direction away from said one side of said second osmotic divider.

12. Apparatus for carrying out a process in which a solute is removed from a solvent by bringing said solvent into contact with one side of a semi-permeable osmotic membrane at a pressure in excess of the osmotic pressure of said solvent, said apparatus comprising: a semi-permeable osmotic membrane; means for bringing a solute-containing solvent to be subjected to said process into contact with one side of said membrane at a pressure in excess of its osmotic pressure; means for withdrawing solvent diminished in its content of said solvent from the other side of said membrane; and means for subjecting said solvent to acceleration greater than gravity in a direction away from said one side of said membrane.

13. Apparatus for carrying out a process in which solute is removed from a solvent by bringing said solvent into contact with one side of an osmotic divider at a pressure in excess of the osmotic pressure of said solvent, said apparatus comprising: an annular osmotic divider; means for bringing a solute-containing solvent to be subjected to said process into contact with the outer surface of said annular divider at a pressure in excess of the osmotic pressure of said solvent; means for withdrawing solvent diminished in its content of said solute from within the annulus of said osmotic divider; and means for rotating the system comprising said osmotic divider and said solute-containing solvent about the axis of the annulus of said osmotic divider whereby said solvent may be subjected to sufficient centripetal acceleration to result in the convection of solvent increased in its concentration of said solute in a direction away from the axis of said annulus.

14. Apparatus as defined in claim 13 wherein said annular osmotic divider is contained in a substantially cylindrical shell, the annular space between the outer surface of said annular osmotic divider and the inner surface of said shell providing a path for movement of solvent.

15. Apparatus as defined in claim 13 wherein a second annular osmotic divider is positioned concentrically within said first mentioned annular osmotic divider so that said solvent diminished in its content of said solute will be subjected to further diminution in its solute content by passage through said second osmotic divider; said rotating means also being adapted to rotate said second osmotic divider about its axis.

16. A process for removing solute from a solvent comprising moving said solute-containing solvent along and in contact with one side of an osmotic divider at a pressure in excess of the osmotic pressure of said solvent; and simultaneously subjecting said solvent to acceleration greater than gravity in a direction away from said one side of said osmotic divider.

17. In a process in which solute is removed from a solvent by bringing said solvent into contact with one side of an osmotic divider at a pressure greater than its osmotic pressure, the improvement comprising subjecting said solvent to sufficient centripetal acceleration to result in the convection of solvent increased in its concentration of said solute and suspended particulate matter contained therein in a direction away from said one side of said osmotic divider.

18. In a process in which matter is removed from a liquid by bringing said liquid into contact with one side of an osmotic divider at a pressure greater than its osmotic pressure and wherein solids accumulate at said one side of said osmotic divider during said process, the improvement comprising subjecting said liquid to acceleration greater than gravity in a direction away from said one side of said osmotic divider, and at least at one point during said process and upon the accumulation of solids at said one side of said osmotic divider interrupting the pressure drop across said osmotic divider so that the sum of the osmotic pressure of said liquid plus the liquid pressure on the downstream side of said osmotic divider is at least as great as the pressure on the liquid on said one side of said osmotic divider.

19. A process as defined in claim 18 wherein said osmotic divider is an osmotic membrane.

20. A process as defined in claim 19 wherein said pressure interruption is effected by subjecting said osmotic membranes to water hammer by the sudden stoppage of flow of liquid away from the downstream side of said osmotic membrane.

21. A process as defined in claim 18 wherein said pressure interruption is effected by subjecting said osmotic divider to water hammer by the sudden stoppage of flow of liquid away from the downstream side of said osmotic divider.

22. In a process in which solute is removed from a solvent, the improvement comprising contacting solvent first with one side of each of at least two concentric osmotic dividers under a pressure greater than the osmotic pressure of the solvent, withdrawing relatively pure solvent containing some solute from the other side of said first osmotic divider into an annular space separating said other side of said first osmotic divider from one side of a second osmotic divider, further purifying said relatively pure solvent by maintaining said relatively pure solvent under a pressure greater than the osmotic pressure of said relatively pure solvent and passing solvent containing less solute through said second osmotic divider, simultaneously subjecting said solvent and said relatively pure solvent to sufficient centripetal acceleration to result in the convection of fluid increased in its concentration of said solute in a direction away from said one side of each of said osmotic dividers, and withdrawing solvent concentrated in solute from the annular space separating said osmotic dividers.

References Cited

UNITED STATES PATENTS

| | | | |
|---|---|---|---|
| 2,411,238 | 11/1946 | Zender | 210—22 |
| 2,678,133 | 5/1954 | Thayer et al. | 210—360 |
| 2,692,854 | 10/1954 | Henley | 210—32 X |
| 3,129,146 | 4/1964 | Hassler | 210—22 X |

OTHER REFERENCES

Ellis: Fresh Water From the Ocean, by Cecil B. Ellis, The Ronald Press Co., New York, pages 75–76 relied upon (1953).

JOSEPH SCOVRONEK, *Acting Primary Examiner.*

MORRIS O. WOLK, *Examiner.*

E. G. WHITBY, *Assistant Examiner.*

UNITED STATES PATENT OFFICE
CERTIFICATE OF CORRECTION

Patent No. 3,355,382                            November 28, 1967

Morgan G. Huntington

It is hereby certified that error appears in the above numbered patent requiring correction and that the said Letters Patent should read as corrected below.

Column 4, line 32, "effect of such membrane inperfaction should read -- effect of any such membrane imperfection --; line 34, "effect" should read -- affect --; lines 60 and 69, "osmosic", each occurrence, should read -- osmosis --. Column 7, line 11, after "Van't Hoff "i"" insert -- factor --. Column 8, line 6, after "that the" insert -- greater the --; line 40, "at" should read -- as --. Column 9, line 7, "ehe" should read -- the --; line 19, "hight" should read -- high --; line 29, after "pressure" insert -- of --. Column 10, line 73, "weight" should read -- weights --. Column 11, line 3, "membrances" should read -- membranes --. Column 12, line 2, "includes" should read -- included --; TABLE No. 1-A, first column, lines 27 and 28 thereof, "1,333= (851 + 0.383)'" should read -- 1,333 + (851 × 0.383) --. Column 13, lines 15 and 16, cancel "brine outlet", first occurrence. Column 14 line 40, after "Table" insert -- No. --; line 52, "234" should read -- 243 --. Column 16, line 41, "change" should read -- damage --; line 62, "534" should read -- 312 --. Column 17, line 25, "membrances" should read -- membranes --. Column 20, line 28, "membranes" should read -- membrane --.

Signed and sealed this 23rd day of September 1969.

(SEAL)
Attest:

EDWARD M. FLETCHER, JR.                      WILLIAM E. SCHUYLER, JR.
Attesting Officer                               Commissioner of Patents